(12) United States Patent
Kruger et al.

(10) Patent No.: US 10,937,175 B2
(45) Date of Patent: Mar. 2, 2021

(54) OPTICAL FLOW BASED ASSISTANCE FOR OPERATION AND COORDINATION IN DYNAMIC ENVIRONMENTS

(71) Applicant: HONDA RESEARCH INSTITUTE EUROPE GMBH, Offenbach/Main (DE)

(72) Inventors: Matti Kruger, Offenbach (DE); Heiko Wersing, Offenbach (DE); Julian Eggert, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 91 days.

(21) Appl. No.: 16/281,827

(22) Filed: Feb. 21, 2019

(65) Prior Publication Data
US 2019/0259167 A1 Aug. 22, 2019

(30) Foreign Application Priority Data

Feb. 21, 2018 (EP) ..................... 18157906
Jan. 15, 2019 (EP) ..................... 19151745

(51) Int. Cl.
| | | |
|---|---|---|
| G06T 7/246 | (2017.01) | |
| G08G 9/00 | (2006.01) | |
| G06K 9/00 | (2006.01) | |
| G06T 7/269 | (2017.01) | |
| G08B 6/00 | (2006.01) | |
| B60W 50/16 | (2020.01) | |

(52) U.S. Cl.
CPC .......... G06T 7/246 (2017.01); G06K 9/00805 (2013.01); G06T 7/269 (2017.01); G08G 9/00 (2013.01); B60W 50/16 (2013.01); *G06T 2207/30252* (2013.01); *G08B 6/00* (2013.01)

(58) Field of Classification Search
CPC ..................... G06T 7/246; G06T 2207/30252
See application file for complete search history.

(56) References Cited

U.S. PATENT DOCUMENTS

| | | | |
|---|---|---|---|
| 9,251,708 B2 * | 2/2016 | Rosenbaum | G08G 1/165 |
| 2014/0207282 A1 * | 7/2014 | Angle | H04L 12/2809 |
| | | | 700/257 |

FOREIGN PATENT DOCUMENTS

| | | |
|---|---|---|
| EP | 2 993 654 B1 | 5/2017 |
| WO | WO 2015/108877 A1 | 7/2015 |

* cited by examiner

*Primary Examiner* — Tuan H Nguyen
(74) *Attorney, Agent, or Firm* — Squire Patton Boggs (US) LLP

(57) ABSTRACT

The method for assisting a person in operating in a dynamic environment may form part of a mobility assistance system. The method comprises a step of acquiring sensor data comprising a time sequence of at least two consecutive images of the dynamic environment from at least one sensor, for example a camera. Optical flows are calculated based on the at least two consecutive images. Feature scores associated to spatial positions for selected regions in an image space are determined in order to generate a feature score field. An output signal including directional stimulus information is generated based on the generated feature score field, wherein the directional stimulus information comprises information on relative spatial relations between the selected regions. The generated output signal is provided to at least one actuator, which signals the directional stimulus information to the person.

26 Claims, 6 Drawing Sheets

OPTICAL FLOW BASED ASSISTANCE FOR OPERATION AND COORDINATION IN DYNAMIC ENVIRONMENTS

BACKGROUND

Field

The invention is in the area of assistance systems for dynamic environments, for example driving assistance systems. The invention concerns in particular a method and a system for assisting a person in operating in the automotive domain, nautical domain or aviation and a corresponding user interface.

Description of the Related Art

Driving assistance systems become increasingly common for vehicles and aim at supporting a person driving an ego vehicle in various ways by fulfilling different functions in order to decrease a workload of the driver in increasingly dynamic and complex traffic situations. Driving assistance systems thereby also increase road safety.

EP 2 993 654 B1 proposes a system for implementing a forward collision warning function. The method determines whether objects in a frontal arc of the ego vehicle are on a colliding path with the ego vehicle. If it is determined, that indeed another vehicle is on a colliding path with the ego vehicle and an estimated time-to-collision falls below a predetermined threshold, the system issues a warning signal to a driver operating the ego vehicle.

However, the method proposed in EP 2 993 654 B1 suffers from the limitation, that only an area to a front of the ego vehicle is monitored and the driver only receives a mere warning signal, without any additional information exceeding the information that a collision is imminent. The method does even not provide a time-to-collision to the person driving the ego vehicle. Thus, the method provides only rudimentary information to the person and is not suited to assist the person operating the ego vehicle in a more general manner.

In another, more general approach, international application WO 2015/108877 A1 discloses a smart necklace with stereo vision and integrated processing capability which is capable of processing image data, object data, positioning data and map data and further provides audible or tactile output to a wearer. Two vibrating actuators on either side of the necklace provide a person wearing the necklace with information for aiding in navigation through an environment. Nevertheless, the necklace provides only directional information and no enhanced information such as distances to other entities to the wearer. Accordingly, an awareness conveyed to the wearer of rapidly changing situations in a dynamic environment is also only limited.

Thus, the technical problem of providing a person with enhanced assisting functionality when operating in a dynamically changing environment is to be solved.

SUMMARY

The method for assisting a person in operating in a dynamic environment according to independent claim 1, the corresponding system and computer program address the technical problem.

The dependent claims define further advantageous embodiments of the invention.

The method for assisting a person in operating in a dynamic environment according to a first aspect acquires sensor data comprising a time sequence of at least two consecutive images of the dynamic environment from at least one sensor. Optical flows are calculated based on the at least two consecutive images to generate an optical flow vector field. Feature scores associated to spatial positions for selected regions in an image space to generate a feature score field are calculated based on the optical vector flow field.

An output signal including directional stimulus information based on the generated feature score field is determined, wherein the directional stimulus information comprises information on relative spatial relations between the selected regions. The output signal is provided to at least one actuator, which signals the directional stimulus information to the person.

The invention supports and enhances a person's perception and understanding of the dynamic environment and enables the person to improve its performance in performing various tasks. Specifically, the invention yields improvements in the correct understanding of movement dynamics of environmental elements relative to at least one entity or location within the dynamic environment in spite of rapid changes.

The improved understanding of movement dynamics increases safety and economics of a navigation behavior of the person, guides its movements and improves the ability to avoid obstacles in the environment in spite of its dynamic nature. For example, safety and performance in various mobility tasks such as driving a car, riding a bike or motorcycle, navigating a boat or vessel as well as monitoring performance in mobile contexts benefit from the inventive method.

The core idea of the invention lies in enhancing the spatial perception of the person operating in the dynamic environment by using optical flow information to generate stimuli, the generated stimuli in particular including non-visual stimuli, wherein the generated stimuli allow a directional assignment of the stimuli.

To achieve this, feature scores are estimated based on optical flow, resulting in a feature score field in an image space. The feature score field is then mapped (translated) into the output signal, which controls at least one actuator to generate at least a directional stimulus to the person.

A stimulus (or plural stimuli) represents a detectable change in the internal or external environment of the person or a vehicle associated with the person. The person is capable to respond to external stimuli or is sensitive to the employed stimuli. When a stimulus is applied to a sensory receptor, the sensory receptors receive information from outside the body of the person. The vehicle associated with the person could be a vehicle monitored by the person and/or remotely controlled by the person.

The method for assisting the person operating in the dynamic environment by providing potentially task-relevant information available in the optical flow vector field combines essentially two main steps.

In a first step, a measurement and estimation of optical flow performed for at least one location in an environment on the one hand, and in the second step a communication of optical flow-based feature scores, containing at least directional information, to the assisted person is effected.

The term optical flow describes the pattern of directions and relative velocities of visible features across a scene in the environment from a given perspective (view angle). Optical flow is thus a relative property of a visible scene that varies depending on the view angle and location (position) in space and being estimated from changes in at least two consecutive images, preferably taken by the same imaging device.

A location for which optical flow is estimated can be referred to as point (or position, location) of observation.

Calculation or at least estimation of optical flow usually relies on the detection of displacements of visual features in a time sequence of images or, more general, an ordered sequence of images. Various algorithms for optical flow calculation are known and may be applied by the skilled person to calculate an optical flow. Calculating an optical flow for a certain position can also base on available optical flow information for another point in a same environment, provided an available model of the environment is available. Thus, not each point of observation necessarily requires its own optical sensor to acquire optical data to calculate the optical flow based thereon.

A variety of features (secondary features) may be extracted from the calculated optical flow, which represents (primary) feature information.

In case of moving through the dynamic environment with visible and extractable features, the calculated optical flow appears to radiate from the point towards which the observer moves. This point presents no optical flow in any particular direction and defines an expansion point in the optical flow vector field.

Similarly when another object approaches an observer on a straight trajectory, the centre of that object displays no optical flow while the area surrounding it, for example the body of the approaching object appears to visually expand in the optical flow vector field. Such approaching objects thus result in additional expansion points signalling to the observer not a suitable travel destination but rather a direction of an imminent impact.

The method according to a preferred embodiment calculates the optical flow as an optical flow vector field comprising at least one expansion point. The feature scores comprise first information on at least one expansion rate around the at least one expansion point in the optical flow vector field.

The expansion point is determined with only limited calculation effort and contains valuable information on the future evolvement of the dynamic environment relative to the sensor, and thus for example the assisted person.

In particular, locations of expansion points in optical flow vector fields for a predetermined at least one viewing angle of a sensor measurement are determined and the determined locations or directions of these expansion points are communicated to the person using the output signal to the actuator.

Using expansion points is particularly advantageous. The expansion point is defined as a center of expansion in the optical flow vector field. The requirement of a center of expansion may be enforced more or less strictly in the context of the invention, for example depending on specific application requirements, data quality of the sensor data and function-tolerance criteria. Function-tolerance criteria could for example specify such that expansion-center movements within a certain spatial and/or temporal range could still qualify.

Expansion points show a noticeable divergence of optical flow vectors. Optical flow vectors point towards an expansion point or emanate from an expansion point, modulo a common translation.

Expansion points can be stationary, or may at least one of moving, shifting, or growing. Expansion points can be overlaid with a translational optical flow.

Furthermore, in some embodiments also the deviation from a static expansion point may itself be used as a signal-influencing factor in the output signal.

The method according to another embodiment is characterized in that the feature scores comprise second information on a relation between the expansion rate and an average local translation vector.

Additionally or alternatively, the method compares the calculated feature scores with at least one threshold value. The determined directional stimulus information is signalled to the assisted person only if the determined feature scores exceed the at least one threshold value.

Thus, the cognitive burden to the assisted person is reduced to the most relevant developments in the dynamic environment.

In a further embodiment, the method generates the output signal based on the determined feature scores comprising mapping the at least one expansion point onto a stimulus location.

Thus, the assisted person may receive (sense) a stimulus issued by the actuator at a sensitive region of a body of the assisted person and the location of the stimulus relays a specific piece of information on the dynamic environment inherent to the calculated optical flow vector field.

Additionally or alternatively, the method generates the output signal based on the determined feature scores using mapping of a direction towards a respective feature location in egocentric coordinates of the assisted person to a perceived stimulus location on a body of the assisted person. The perceived stimulus location essentially corresponds to the direction of the respective feature location in egocentric coordinates of the person.

The assisted person receives the stimulus issued by the actuator at a sensitive region of a body of the assisted person and the location of the stimulus conveys a specific piece of directional information on the dynamic environment in a manner, which guides the attention of the assisted person into the relevant direction.

Preferably the method generates the output signal based on the determined feature scores using a mapping of the at least one expansion rate onto at least one stimulus parameter. The at least one stimulus parameter may in particular be at least one of a stimulus location, a stimulus frequency and a stimulus intensity.

Thus, not only a directional information on the dynamic environment, but also other aspects such as an urgency of a situation, or even relative urgency of multiple aspects of the evolvement of the scene in the dynamic environment may be communicated, using multiple stimulus dimensions such as direction, frequency and intensity of the stimulus independently from each other.

Relative velocities between an object in the image and an entity at the location of the sensor can be encoded by modulating a stimulus parameter.

Expansion rates of slow features can be encoded in a parameter of the output signal that potentially influences a stimulus saliency, for example an intensity, perceived by the person.

Additionally or alternatively, the method generating the output signal is based on the determined feature scores also including a mapping of the feature score field to an egocentric image frame of the person.

Thus, an intuitive understanding of the dynamic environment is supported by translating the information inherent in the optical vector flow field over the feature score vector field to the respective coordinates and limits of the visual perception capabilities of the assisted person.

If a feature score field in an image space, containing estimates for movement directions and relative velocities of visible features at the respective image locations is mapped onto an egocentric reference frame of the assisted person, a correspondence between stimulus-location as perceived by the person and an actual spatial feature location and feature direction is generated. The spatial awareness of the person is significantly increased.

Locations relative to which the optical flow is calculated thereby correspond to one or multiple locations in the dynamic environment in which the assisted person operates or which it monitors. This possibly includes the person's own location or a location of a physical entity controlled by the person or even any other location, which may be of interest for performing a task in the dynamic environment.

An advantageous embodiment of the method calculates at least one further optical flow for at least one further viewing angle (perspective) and determines further feature scores based on the at least one further optical flow. The generated output signal includes directional stimulus information based on the determined feature scores and further feature scores.

Accordingly, this embodiment is not limited to a single position of observation such as the location of the assisted person, and the respective viewing angle of the assisted person. Instead, one or multiple positions for observing the environment are located at suitable positions with respective coordinates in the environment, for example at positions of certain entities or parts of entities. In a particular use context, for example when maneuvering a large vehicle, it is advantageous to obtain optical flow information from viewing angles of multiple portions or sides of the vehicle to gain more precise information about where each portion of the vehicle is currently heading or which portion of the vehicle is on a collision path with another object.

Depending on the embodiment, different feature scores derived from optical flow may be determined and communicated to a user.

Additionally or alternatively, the information that the person receives may originate from calculated optical flows for one or more locations in the dynamic environment.

The method according to an advantageous embodiment generates the output signal based on the determined feature scores and comprises determining stimulus signals, in particular at least one of tactile signals, audible signals, vestibular signals, chemical signals, electronic signals, or olfactory signals, perceivable by the human based on the determined feature scores.

Communicating of environment relevant information may thereby occur using one or multiple modalities of signaling enabling a differentiation between spatial locations and/or directions using a stimulus location or a stimulus code. For example, signals that the person perceives using its senses for vision, sound, touch, temperature, orientation and acceleration as well as signals provided through electromagnetic or chemical stimulation. In particular, the stimulus signals are applied to portions of the assisted person's body, which have sufficient spatial resolution and/or provide particular decoding capabilities for the stimulus signals.

It is preferable and advantageous to encode location or direction information in a non-visual signal, for example a tactile signal in order to communicate information for assisting the person without simultaneously impairing visual perception of other relevant elements in the environment when the person is performing a specific task in the environment. A perceived stimulus location on the body (e.g. torso) of the person may roughly correspond to the direction (orientation) towards the respective feature location in egocentric coordinates of the person. Alternatively or additionally, a sound, which appears to originate from the direction of a feature location can be generated. Such direct match between a perceived stimulus location and an actual feature location could be preferable but not strictly necessary for many use-cases.

According to an embodiment, the output signal communicates at least one of at least one location of the expansion point and at least one direction towards the expansion point relative to at least one location of observation of the sensor.

A mapping between expansion point locations or directions relative to the person or the physical entity associated with perceived stimulus locations in an egocentric reference frame may be preferable. Multiple expansion points may be communicated to the person simultaneously or in succession depending on the respective output signal's characteristics and, for example, an extent of interference.

In an embodiment, multiple expansion points for multiple locations of observation, possibly being associated with multiple physical entities, are communicated simultaneously in the output signal.

Different stimulus or perception locations, modes or stimulus-characteristic variables such as stimulus frequency, stimulus intensity or else could then be used to additionally encode the identity of the observation location or the corresponding physical entity.

Some advantageous embodiments may use an amount of deviation from stability, for example a moving expansion point, as a signal-influencing factor in the output signal. Thus, a measure of certainty of the assistance is communicated, for example using a temporal characteristic of the stimulus. The temporal characteristic may comprise for example a duration of the stimulus and/or a ratio of the stimulus intensity to the stimulus duration.

Additionally or alternatively the at least one rate of expansion around the center of each expansion point is communicated by the output signal.

Additionally or alternatively a spatial characteristic of the stimulus such as its covered area (instantaneous or over time in case of a moving stimulus) may be proportional to the (un-)certainty in at least one signal dimension.

Additionally or alternatively, the output signal communicates a rate of expansion surrounding an expansion point using one or multiple modalities. For example in case of a tactile torso stimulation of the body of the person at the location corresponding to an expansion point's relative direction from the location of observation, a parameter of the tactile stimulus such as pressure, intensity, vibration frequency, duration or pattern may be used to encode a rate of expansion.

Additionally or alternatively, distinct temporal and spatial resolutions of different sensory modalities render certain combinations of sensory modalities advantageous.

Additionally or alternatively, using the same sensory modality to communicate both a direction and a location and an expansion rate in the output signal might be preferable in many scenarios.

Additionally or alternatively, using multiple sensory modalities in a further embodiment to communicate identical or at least partially overlapping information can be advantageous in many scenarios in order to benefit from multisensory facilitation and compensate for individual handicaps of the assisted person.

Additionally or alternatively, it is preferable to encode in the output signal the expansion rate in a saliency-contingent manner, for example such that a fast expansion rate is being perceived as more salient than a slow expansion rate.

Additionally or alternatively, the output signal encodes the rate of expansion, wherein the rate of expansion is modulated by additional factors. Since the rate of expansion is basically reversely proportional (anti-proportional, reciprocally proportional) to the time to collision, an additional modulation, e.g. using the own moving velocity, can be used to generate signals encoding time headway (time headway related signals).

Without the modulation, the communicated rate of expansion for the expansion point which corresponds to the own heading direction of a moving person or physical entity would for example also encode an own moving velocity as well as the time to collision in the heading direction. Modulating a communicated rate of expansion such that it is reduced by an amount corresponding to or proportional to the own velocity for the heading direction causes a loss of this velocity information in the communicated signal and means that any rate of expansion in the heading direction only encodes a time to collision.

Additionally or alternatively, the communicated rate of expansion for the heading direction could also be reduced by an amount proportional to the current speed limit. This ensures that a driver is informed about a speed limit compliance of his operational behavior.

According to another advantageous embodiment, the output signal comprises the optical flow combined with distance information acquired for example from one or more additional sensors, such as a radar, Lidar or acoustic sensor or any optical method for measuring distances.

The optical method for measuring distances can for instance base on evaluating stereo-images or rely on a database of average sizes for visually classifiable objects extracted from the images of the environment.

Such distance information can then for example be used to scale a corresponding expansion rate signal. Two objects of different size may cover the same amount of visual space when they are located at different distances from the location of view. If both of the objects approach the person at the right velocities, the resulting optical expansion could be identical for both from the observer's perspective despite differences in size and distance of the objects. Scaling or supplementing the output signal by distance information is advantageous for embodiments in which knowledge about the absolute spatial distance is required.

According to a second aspect of the invention, a system for assisting a person in operating in a dynamic environment solves the technical problem. The system comprises an acquisition unit configured to acquire sensor data comprising a time sequence of at least two consecutive images of the dynamic environment from at least one sensor. The system comprises a processor configured to calculate optical flow based on the at least two consecutive images, to determine feature scores associated to spatial positions for selected regions in an image space to generate a feature score field and to generate an output signal including directional stimulus information based on the generated feature score field. The directional stimulus information comprises information on relative spatial relations between the selected regions. The processor provides the output signal to at least one actuator. The actuator is configured to signal (to communicate) the directional stimulus information to the assisted person.

The system according to an advantageous embodiment shows the assisted person being associated with a physical entity, for example a vehicle, a two-wheeled vehicle, an airplane or a vessel. It is particularly advantageous, when the person monitors the physical entity.

According to an advantageous embodiment, a viewing angle of the sensor corresponds to a viewing angle of the physical entity instead or in addition to a viewing angle of the person.

Certain tasks require a person to monitor physical entities, although the person is situated at another location than the monitored physical entity. Positions of observation may also be positions of the respective entities instead of or in addition to the position of the assisted person in charge of the monitoring.

For example, the person may also be able to interpret such signals produced for the physical entity not directly controlled by the assisted person. A possible use case includes the task of monitoring another traffic participant such as a motorcycle novice monitored by a trainer or driving teacher. The system allows the trainer to grasp situations from the perspective of the driving novice and thus to provide appropriate instructions, advice and warnings.

Similarly, a co-driver in a car has a slightly shifted perspective compared to the driver and may, with optical flow-based information from a driver's perspective be better able to understand a scene from the driver's perspective. This could similarly provide help to driving instructors and might even help to prevent conflicts with nervous co-drivers who may have difficulties in understanding a driving situation from their own shifted perspective.

In another use context of this embodiment, an air traffic controller is enabled to improve integration of information about the trajectories of multiple airplanes with optical flow information for one or multiple entities such as airplanes of interest. The air traffic controller can receive optical flow-based information from the perspectives of individual airplanes to improve trajectory estimation. Additionally or alternatively optical flow information from the perspectives of critical landing zone and parts of or an entire runway or taxiway can be communicated. Thus monitoring is improved for particular critical areas in the environment of an airport. In addition to potential qualitative gains, especially in combination with using multiple sensory modalities receiving information about different locations or scene variables in the dynamic environment, a monitoring bandwidth and a capability of the assisted person increase.

According to a third aspect, the problem is solved by a computer program with program-code means for executing the steps according to an embodiment of the method for assisting in operating in a dynamic environment when the computer program is executed on a computer or digital signal processor.

BRIEF DESCRIPTION OF THE DRAWINGS

Embodiments of the invention are discussed with reference to the figures, in which.

DETAILED DESCRIPTION

In the figures, same reference signs denote same or corresponding elements. The discussion of same reference signs in different figures is omitted where possible for sake of conciseness.

Figure 1:
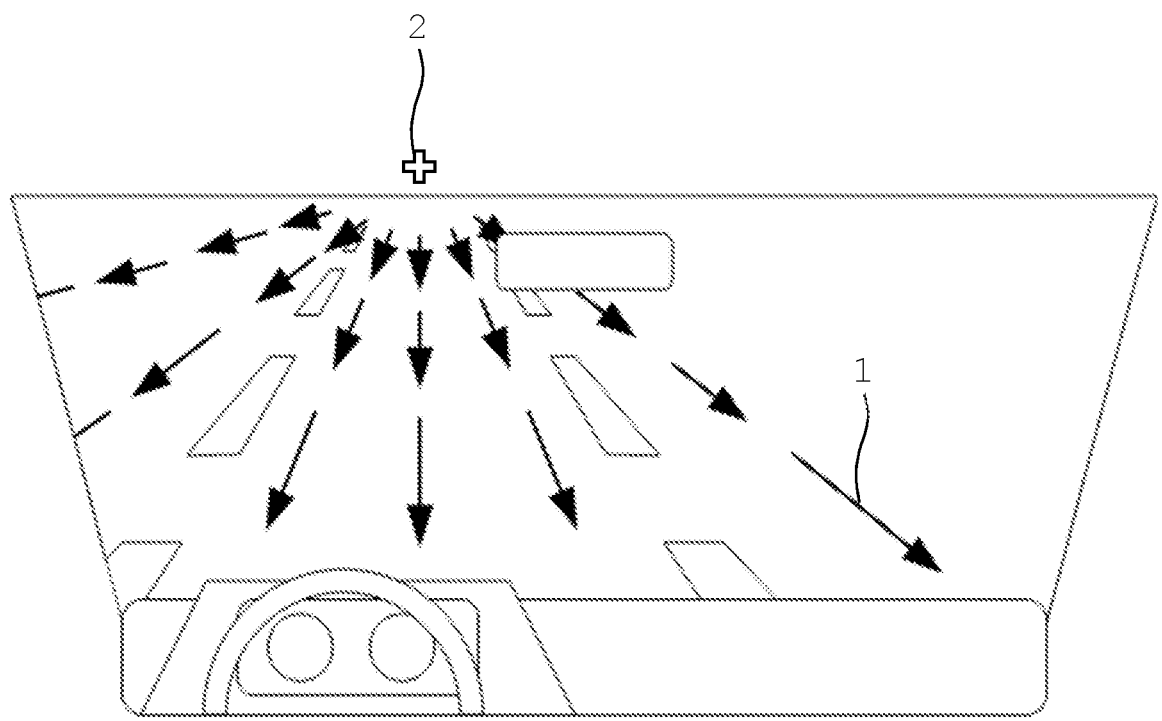
FIG. 1 depicts a first optical flow visualization from a driver's perspective in a vehicle.

FIG. 1 depicts a first optical flow visualization from a driver's perspective in a vehicle. The vehicle is an instance of a physical entity, which is operated by the person. The visualization assumes the assisted person to be a driver of the vehicle in a traffic environment as an example of a dynamic environment.

An orientation of an arrow 1 represents the direction of an optical flow at the respective scene location in the environment. A length of the arrow 1 represents a velocity of the optical flow at the respective scene location.

As the velocity of the optical flow is calculated in terms of the amount of displacement in image coordinates, camera coordinates or retina coordinates of more distant regions in an upper part in the visualization of FIG. 1 show a slower optical flow than nearby regions in a lower part of the visualization for a predetermined ego velocity of the vehicle.

An expansion point 2 from which the optical flow appears to originate corresponds to a heading direction and/or current destination of the ego vehicle.

The assistance function in FIG. 1 would thus produce a stimulus indicative of the heading direction of the ego vehicle with a saliency that is proportional to the flow surrounding the expansion point 2.

As the optical flow is naturally slower in the distance than in proximity of the dynamic environment, the saliency for distant expansion points 2 is generally lower than the saliency for nearby expansion points 2 for a given approach velocity.

Figure 2:
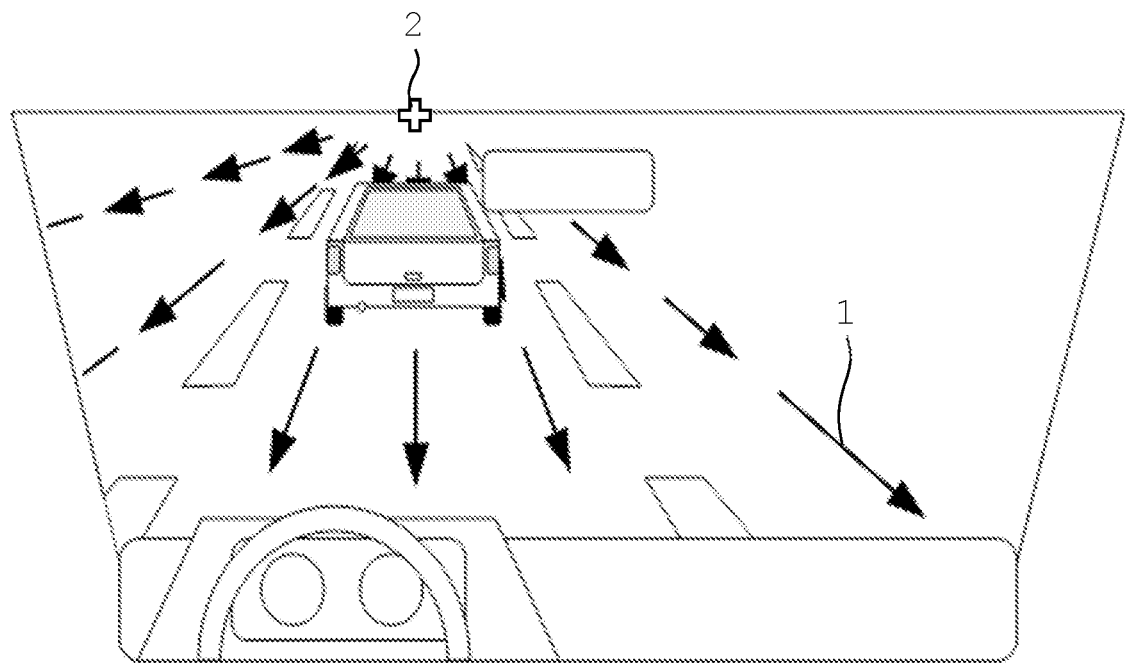
FIG. 2 depicts a second optical flow visualization from the driver's perspective in the vehicle.

FIG. 2 depicts a second optical flow visualization from the driver's perspective in the ego vehicle.

FIG. 2 illustrates that, in case another object, for example a further vehicle 3, moves at a same vehicle speed and on a same trajectory as the ego vehicle in the visualized scene, there exists no optical flow at the location of the further vehicle 3. This applies because no displacement of visual features between the two consecutive images of the sequence of images in the sensor data occurs.

Figure 3:
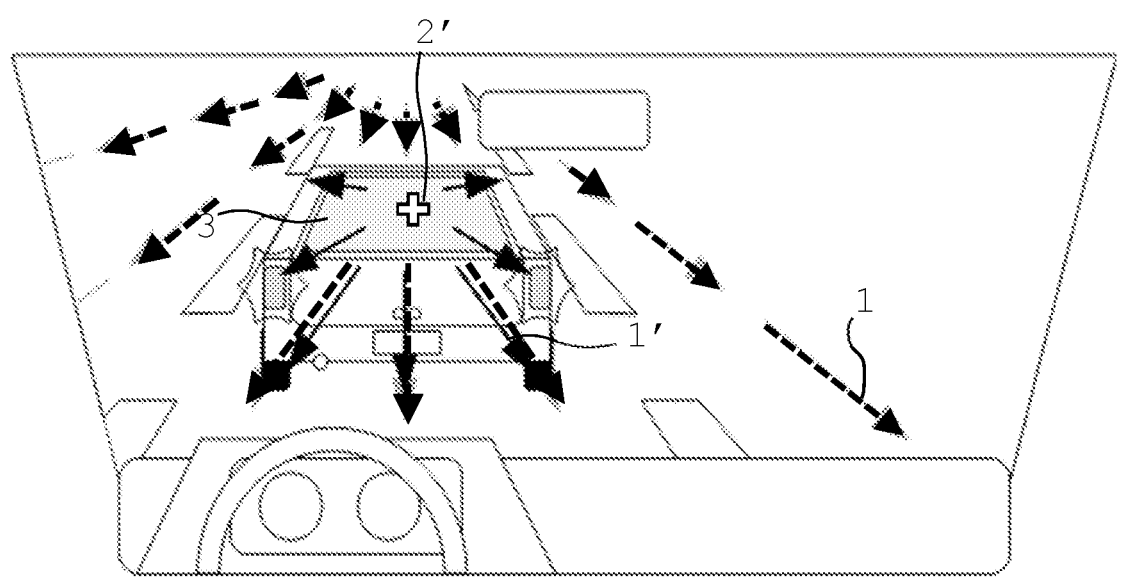
FIG. 3 depicts a third optical flow visualization from the driver's perspective in the vehicle.

FIG. 3 depicts a third optical flow visualization from the driver's perspective in the ego vehicle.

FIG. 3 illustrates continuation of the scene depicted in FIG. 2 taken at a later point in time than FIG. 2.

The further vehicle 3 reduced its vehicle velocity relative to the ego vehicle's own vehicle velocity. Thus, the visual representation of the further vehicle 3 in the image in FIG. 3 expands when compared to the visual representation of the further vehicle 3 in FIG. 2. The optical flow is shown in FIG. 3 depicted by solid line arrows 1' with a new, second expansion point 2' in addition to the optical flow depicted by dotted line arrows 1 of the remaining scene in the visualization in FIG. 3.

From the visualizations shown in FIGS. 1 to 3 it becomes clear, that a use of the invention may have positive effects on a person's situation assessment with respect to the changes in the dynamic environment changing from FIG. 2 to FIG. 3. An improved understanding of movement dynamics in the dynamic environment can allow for safer and more economical navigation behavior, movement guidance and obstacle avoidance by the assisted person.

Safety and performance in various mobility tasks such as riding a bike or motorcycle, driving a vehicle, navigating a boat, vessel or aircraft, as well as monitoring tasks in such mobility contexts could thus benefit from the invention.

Figure 4:
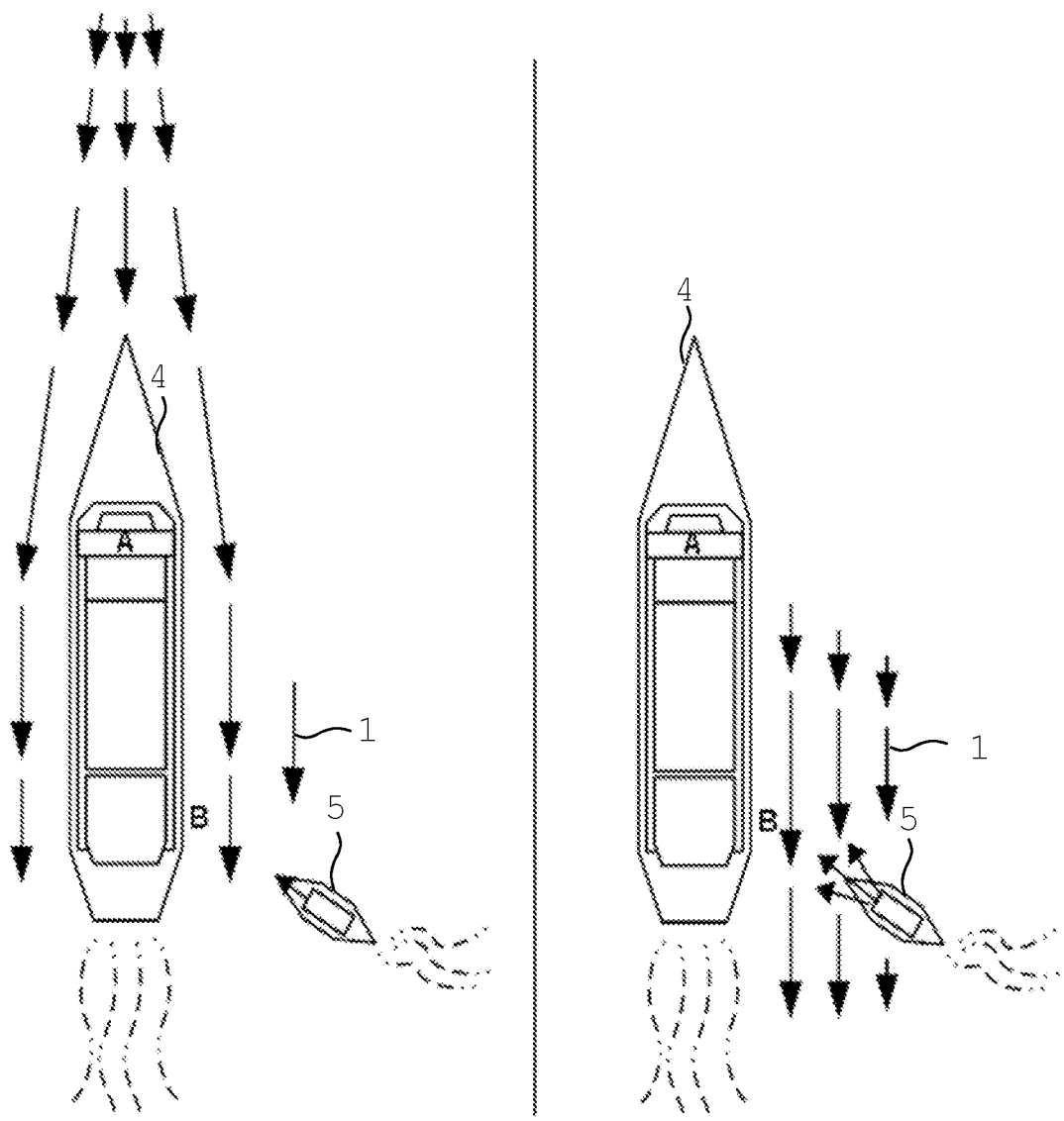
FIG. 4 depicts an optical flow visualization for moving vessels with optical flow with validations from two different viewing angles.

FIG. 4 depicts an optical flow visualization for a first vessel 4 and a second vessel 5 with optical flow, which is validated by sensor data from two different viewing angles and positions in a view from above.

The orientation of an arrow 1 represents the direction and its length represents the velocity of optical flow at the respective scene location in FIG. 4.

The left portion of FIG. 4 is based on sensor data taken from position A corresponding to a viewing angle (perspective A). The movement of the first vessel 4 causes optical flow with a stable expansion point 2 at the horizon in front of the first vessel 4.

The second vessel 5 approaches from the lower right and produces small optical flow on a trajectory that does not intersect with point A. The optical flow produced by the second vessel 5 generates no stable expansion point 2 when calculated from position A.

The right portion of FIG. 4 is based on sensor data taken from position (perspective) B in a bottom right part of the first vessel 4. The movement of the first vessel 4 causes a constant optical flow moving from one side (top) to the other (bottom) of FIG. 4.

Nevertheless, from the viewing angle from position B, the approach of the second vessel 5 generates additionally a stable expansion point 2 and thus indicates an upcoming collision from a direction of the second vessel 5. This illustrates the advantage, which a communication of optical flow features from the viewing angle of the respective object boundary-part, position B in FIG. 4 can have over only taking optical flow from a single viewing angle and location, for example corresponding to position A in FIG. 4, into account.

Figure 5:
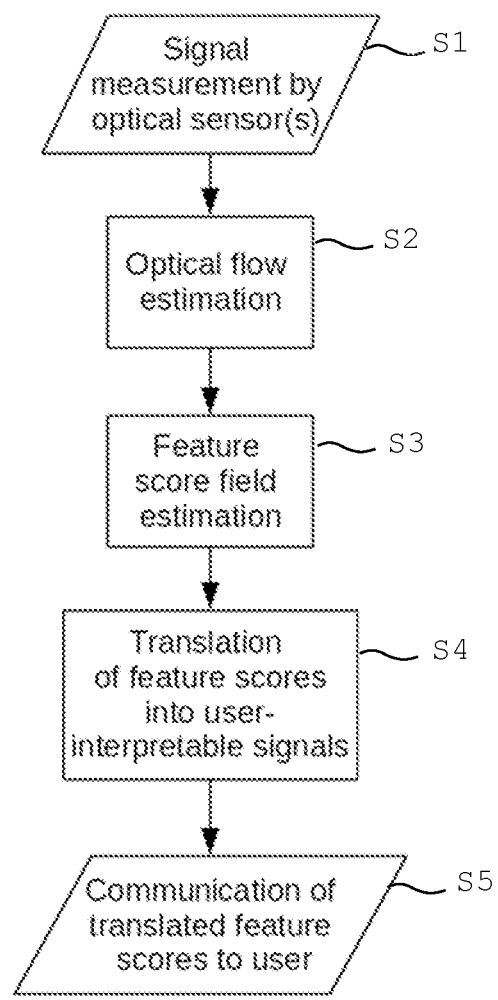
FIG. 5 shows a simplified flow chart for a first embodiment of the method.

FIG. 5 shows a simplified flow chart for a first embodiment of the method for assisting a person in operating in a dynamic environment.

In step S1, one or more sensors are used to obtain a time sequence of images from the environment.

In step S2 the sequence of images is used to calculate or estimate the optical flow based on the image data.

In subsequent step S3, based on the calculated optical flow, feature scores for selected regions in the at least two images from different points in time with their associated positions are determined.

In step S4, the feature scores are mapped (translated) into one or more output signals and provided to at least one actuator 10. The one or more output signals comprise directional information, which at least can be interpreted as directional stimuli when perceived by the person.

In step S5, the output signals generated in step S4 are communicated to the person after having been provided to at least one actuator 10.

Figure 6:
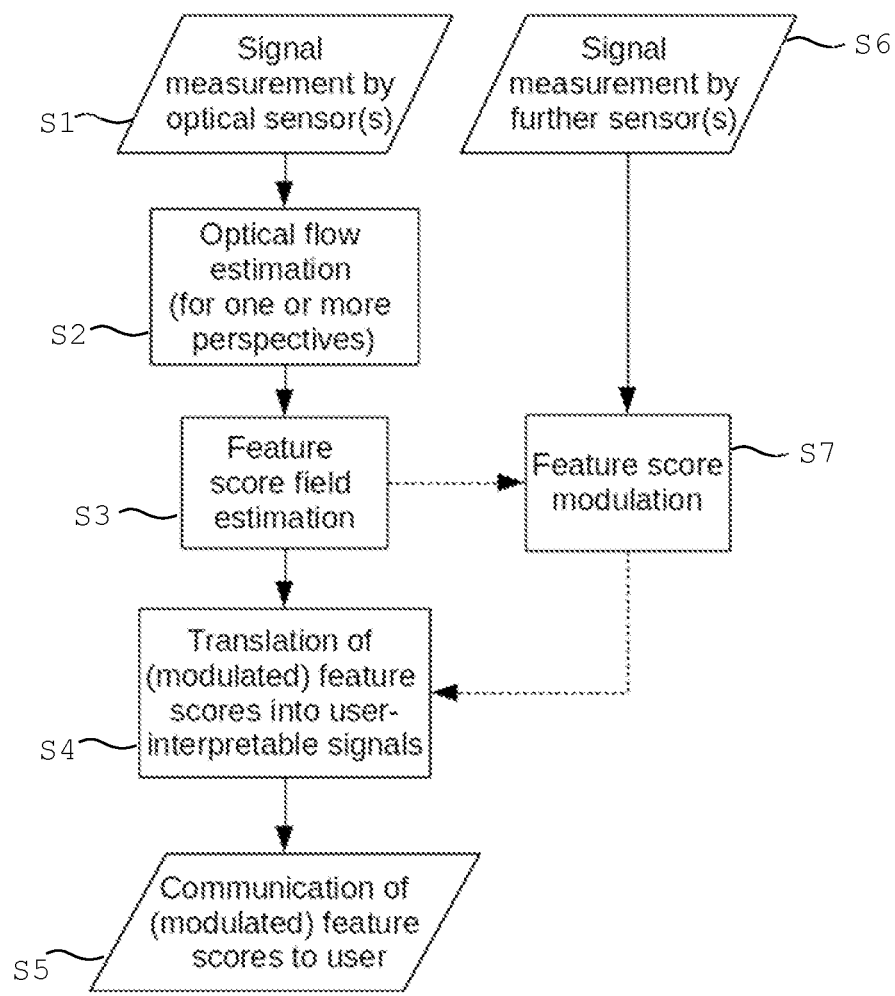
FIG. 6 shows a simplified flow chart for a second embodiment of the method, and FIG. 7 provides an overview of the system according to the invention.

The basic process of the method for assisting a person in operating in the dynamic environment may be extended to include a feature score modulation as shown in FIG. 6.

FIG. 6 shows a simplified flow chart for a second embodiment of the method.

The extended process of generating the output signal includes all steps S1, S3, S4 and S5 of the basic process as shown in FIG. 5.

Step S2' in FIG. 6 corresponds to step S2 in FIG. 5, except that the sequence of images is used to calculate the optical flow based on the image data that has been acquired for one viewing angle or for multiple viewing angles.

In addition to the steps described in FIG. 5, the second embodiment also includes a step S6 of acquiring further sensor data and a step S7 of modulating feature scores.

In step S6, further sensor data is acquired from at least one further sensor 7. The further sensor data may include distance information of a distance between the further sensor 7 and an object in the image information.

In step S7 the calculated feature score from step S3 is modulated based on the further sensor data acquired in step S6. Thus, the modulated feature scores provided by step S7 use information from both optical feature score estimation as well as from the further sensor 7.

Figure 7:
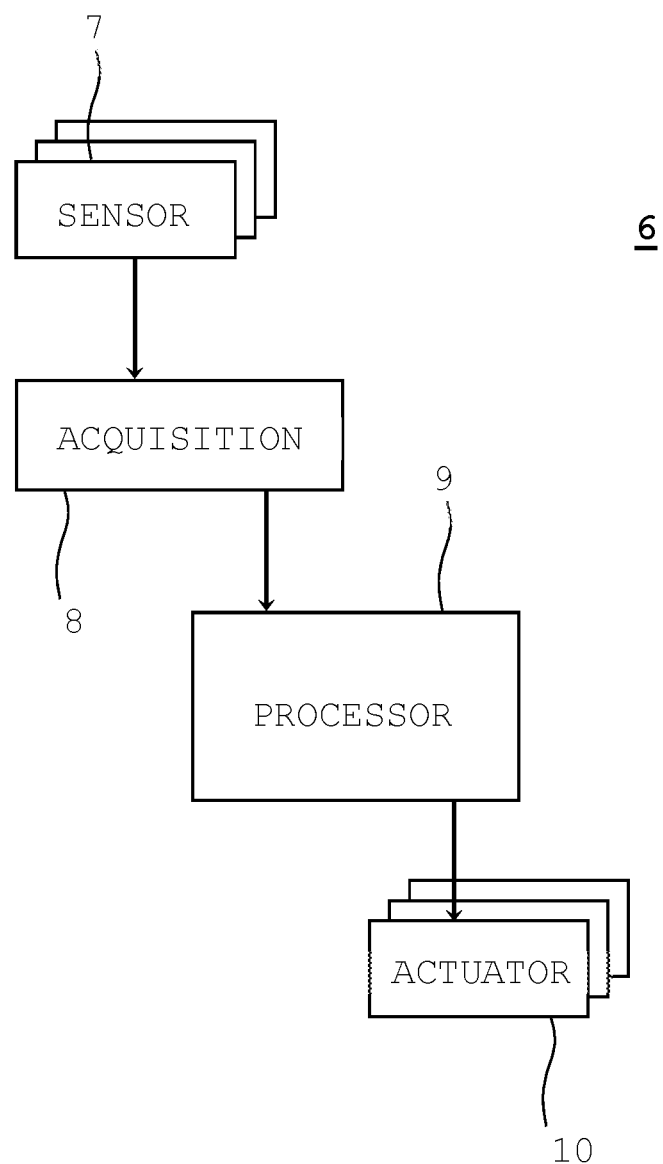

FIG. 7 provides a simplified overview of an embodiment of the system 6 for assisting the person in operating a dynamic environment according to the invention.

The system 6 comprises a sensor module or sensor 7, for example a camera, for recording 360° images of a scene around a vehicle from a sensor location. The sensor module may comprise plural sensors 7 arranged at plural sensor locations, in particular at different vehicle body boundaries, each sensor 7 with a predetermined viewing angle. In particular, the sensor module 7 captures a time sequence of consecutive images and generates sensor data from the recorded time sequence of images.

An acquisition module 8, for example an interface, acquires the sensor data from the at least one sensor 7 and provides the sensor data to a processing module 9.

The processing module 9, for example including one or more processors and associated transient and non-transient memory capacity runs an application software (program) for calculating optical flow information by inferring movement vectors of visual features, for example using features such as edges or shapes in the images of the time sequence of images, from subsequently captured images.

A tactile user interface 10 including for example an array of equally spaced vibromotors arranged around a body of the person is able to cause tactile sensations (stimuli) that can be located with only a limited location error by the person. The location error may be smaller than 4 cm. A perceived stimulus location corresponds to the direction of the corresponding expansion point and the stimulus strength encodes the (positive) expansion rate around that expansion point. In an alternative implementation, the strength encodes the certainty about the expansion point and the frequency of stimulation encodes the expansion rate.

The processing module 9 maps expansion points and expansion rates from the optical flow information onto a human interface to the assisted person. In this case a correspondence of stimulus sides and expansion point directions is made such that different portions of the interface can respond to optical flow information from different perspectives.

In the depicted form the assistance system 6 can inform its user about multiple environment related events and components of a scene, for example a traffic scene in the dynamic environment.

An example for such a component of a scene in the dynamic environment is a heading direction. A movement of the ego vehicle causes an almost stable expansion point in the ego-vehicle's heading direction.

A further example for such a component of a scene in the dynamic environment is a (vehicle) velocity. The expansion rate surrounding the expansion point created by an ego movement is proportional to the ego vehicle's own vehicle velocity.

Yet a further example for such a component of a scene in the dynamic environment are upcoming collisions. Another object, which is on a collision path with the ego vehicle creates an expansion point and the expansion rate, for example an area generated by the object outlines in the flow vector field comprises information about the velocity difference between the ego vehicle and the object. In combination with distance information, size information of the other object, or velocity information about the ego vehicle, the expansion rate, and the expansion point include information on the direction and time until a collision takes place (time-to-collision, TTC).

The method for assisting a person in operating in a dynamic environment is particularly advantageous in a multitude of scenarios.

In a traffic environment, certain situations on a road such as a sudden congestion or accelerating drivers increase a risk of rear-end accidents. Applying the invention results in an expanding visual stimulus for a quickly approaching vehicle from behind. Aspects of the traffic environment, in particular of the ego vehicle and the approaching vehicle, should thus be encoded in the output signal, for example in a tactile assistance signal. A person operating the ego vehicle and being informed about such an approaching danger has more chances of preventing a rear-end accident because he doesn't have to shift his focus of overt attention usually directed to the front of the ego vehicle to learn about the danger coming up from the rear end of the ego vehicle.

Similarly, the assisted person's approach to a suddenly decelerating object on a same lane of a road generates a quickly expanding visual stimulus which when signaled with a corresponding saliency and together with a visual stimulus, may improve the reaction of the person due to multisensory facilitation.

The described method and system may provide means for obtaining an optical flow vector field from viewing angles extending from multiple and even spatially opposite vehicle boundaries. Thus, a collision avoidance is additionally facilitated compared to the use of flow information from only one, usually the person's own, viewing angle. Especially for large vehicles, such as a bus, a container vessel and an airplane, using only optical flow information from the viewing angle of the person operating the vehicle would constrain the utility of the assistance system to events and scenes near the person. Upcoming collisions, for example to a rear of the vehicle would not be anticipated because the optical flow from the person's viewing position and angle would not present features that are characteristic of collisions, contrary to the stable expansion points as an example from the optical flow vector fields. However, more optical flow estimations specific to plural different viewing angles (viewing directions) from the ego vehicle would contain such characteristic features and appropriately inform the assisted person. The assistance system and the assistance method would enable the person to simultaneously observe the surrounding environment from multiple perspectives or put differently, apply a more ego vehicle-centered perspective. This applies in particular to the naval scene depicted in FIG. 4, for example.

Priority-of way violations: When having priority of way, a driver is less likely to check for vehicles approaching from other lanes. This makes cases in which the priority of way is violated particularly dangerous. Vehicles approaching from the side create an expanding visual stimulus and thus may be encoded in the tactile assistance signal, giving the driver as the assisted person the chance to react even in cases where the assisted person has not perceived the other vehicle.

A particular advantageous field of use is assisting a person in speed limit compliance. Especially in demanding scenarios in a dynamically changing traffic environment, monitoring an applicable speed limit may have low priority to the person operating the ego vehicle. The proposed assistance function could inform the person about the ego vehicle's speed through another modality not directly affected by high visual demands. Speed limit compliance is thus facilitated. Furthermore, with the addition of modulating the expansion rate for the heading direction according to the current speed limit the assisted person is made aware about any speed limit deviation by default.

A person who is familiar with the kind of assistance provided in the embodiments discussed above may also be able to interpret such output signals generated for an entity not directly controlled by the assisted person. An advantageous embodiment is the task of monitoring another traffic participant such as a motorcycle novice who is monitored by a trainer. The assistance system enables the trainer to better understand a situation from the novice's perspective. The trainer is enabled to provide more appropriate instructions, advice and warnings to the novice.

An air traffic controller may be able to improve integration of information about the trajectories of multiple airplanes with optical flow information for one or multiple entities of interest. For instance the controller could (selectively) receive optical flow information from the perspectives of individual airplanes to improve trajectory estimation. Alternatively optical flow information from the perspectives of critical landing zone and runway parts could be communicated to improve monitoring in such critical areas. In addition to potential qualitative gains, especially in combination with multiple sensory modalities receiving information about different locations or scene variables this could improve "monitoring bandwidth".

The example implementations of the invention as well as the specific scenarios show how the user will benefit from the assistance in operating in the dynamic environment described in the examples. The discussed examples serve illustrative purposes but are not intended to restrict the invention defined in the appended claims.

The invention claimed is:

1. Method for assisting a person in operating in a dynamic environment, the method comprising:
    acquiring sensor data comprising a time sequence of at least two consecutive images of the dynamic environment from at least one sensor;
    calculating optical flow as an optical flow vector field comprising at least one expansion point based on the at least two consecutive images;
    determining feature scores associated with spatial positions for selected regions in an image space to generate a feature score field;
    generating an output signal including directional stimulus information based on the generated feature score field, wherein
    generating the output signal comprises mapping the at least one expansion point onto a stimulus location and mapping a direction towards a respective feature location in ego-centric coordinates of the person to a perceived stimulus location on a body of the person which essentially corresponds to the direction of the respective feature location in ego-centric coordinates of the person;
    providing the output signal to a plurality of actuators; and
    signalling the directional stimulus information to the person by the plurality of actuators.

2. The method according to claim 1,
    the feature scores comprise first information on at least one expansion rate around the at least one expansion point in the optical flow vector field.

3. The method according to claim 2, wherein
    the feature scores comprise second information on a relation between the expansion rate and an average local translation vector.

4. The method according to claim 2, wherein the generating the output signal based on the determined feature scores comprises mapping the at least one expansion rate onto at least one stimulus parameter, in particular at least one of a stimulus location, a stimulus frequency and a stimulus intensity.

5. The method according to claim 2, wherein the generating the output signal based on the determined feature scores comprises mapping the feature score field to an ego-centric image frame of the person.

6. The method according to claim 2, wherein
    the output signal communicates both a direction and a location and an expansion rate using a same sensory modality.

7. The method according to claim 2, wherein
    the output signal encodes the expansion rate in a saliency-contingent manner, in particular that a fast expansion rate signals an increased saliency over a slow expansion rate.

8. The method according to claim 2, wherein
    the output signal uses multiple sensory modalities to communicate a same directional information.

9. The method according to claim 2, wherein
    the output signal encodes the expansion rate, wherein the expansion rate is modulated by additional factors, in particular by an amount proportional to the own velocity for the heading direction or proportional to a current speed limit.

10. The method according to claim 2, wherein
    the output signal encodes the expansion rate, wherein the expansion rate is modulated by additional factors.

11. The method according to claim 2, wherein
    the generated output signal comprises the optical flow combined with distance information, such as distance information from one or more additional sensors.

12. The method according to claim 1, further comprising comparing the feature scores with at least one threshold value, wherein
    the directional stimulus information is signalled to the person only if the feature scores exceed the at least one threshold value.

13. The method according to claim 1, further comprising calculating at least one further optical flow for at least one further viewing angle; and
    determining further features scores based on the at least one further optical flow;
    wherein the generated output signal includes directional stimulus information based on the determined feature scores and further feature scores.

14. The method according to claim 13, wherein the generating the output signal is based on the determined feature scores and further feature scores for same spatial directions.

15. The method according to claim 13, wherein the
generating the output signal for different spatial directions is based on the determined feature scores and further features scores.

16. The method according to claim 1, wherein
the output signal communicates at least one of at least one location of the expansion point and at least one direction towards the expansion point relative to at least one location of observation of the sensor.

17. The method according to claim 1, wherein
the output signal communicates at least one expansion rate around the center of each expansion point.

18. The method according to claim 1, wherein
the output signal communicates simultaneously multiple expansion points for multiple locations of observation, in particular the multiple locations of observation associated with multiple physical entities.

19. The method according to claim 1, wherein
the output signal communicates multiple expansion points to the person simultaneously or successive in time depending on characteristics of the output signal or an extent of interference.

20. The method according to claim 1, wherein
the output signal communicates an expansion rate surrounding an expansion point using one or multiple sensory modalities, in particular using a parameter of a tactile stimulus such as a pressure, an intensity, a vibration frequency, a duration or a pattern of the tactile stimulus to encode the expansion rate.

21. The method according to claim 1, wherein
generating the output signal is based on the determined feature scores comprising determining signals, in particular at least one of tactile signals, audible signals, vestibular signals, chemical signals, electronic signals, or olfactory signals, perceivable by the human based on the determined feature scores.

22. A computer program with program-code embodied on a non-transitory computer-readable medium for executing the steps according to claim 1, when the computer program is executed on a computer or digital signal processor.

23. System for assisting a person in operating in a dynamic environment, the system comprising:
   an acquisition unit configured to acquire sensor data comprising a time sequence of at least two consecutive images of the dynamic environment from at least one sensor; and
   a processor configured to
   calculate optical flow as an optical flow vector field comprising at least one expansion point based on the at least two consecutive images,
   determine feature scores associated to spatial positions for selected regions in an image space to generate a feature score field,
   generate an output signal including directional stimulus information based on the generated feature score field, wherein
   generating the output signal comprises mapping the at least one expansion point onto a stimulus location and mapping a direction towards a respective feature location in ego-centric coordinates of the person to a perceived stimulus location on a body of the person which essentially corresponds to the direction of the respective feature location in ego-centric coordinates of the person, and to
   provide the output signal to a plurality of actuators, wherein the plurality of actuators are configured to signal the directional stimulus information to the person.

24. The system according to claim 23, wherein
the person is associated with a physical entity, in particular a vehicle, a two-wheel vehicle, an aeroplane or a vessel,
wherein the person monitors the physical entity.

25. The system according to claim 24, wherein
a viewing angle of the at least one sensor corresponds to a viewing angle of the physical entity instead or in addition to a viewing angle of the person.

26. The system according to claim 23, wherein
the system comprises the at least one sensor, in particular an optical sensor such as a camera.

* * * * *